April 19, 1927. 1,624,906
J. BAUER
WINDSHIELD
Filed April 9, 1923 2 Sheets-Sheet 1

J. Bauer, Inventor.

By C. A. Snow & Co.
Attorneys.

April 19, 1927.  
J. BAUER  
WINDSHIELD  
Filed April 9, 1923  
1,624,906  
2 Sheets-Sheet 2
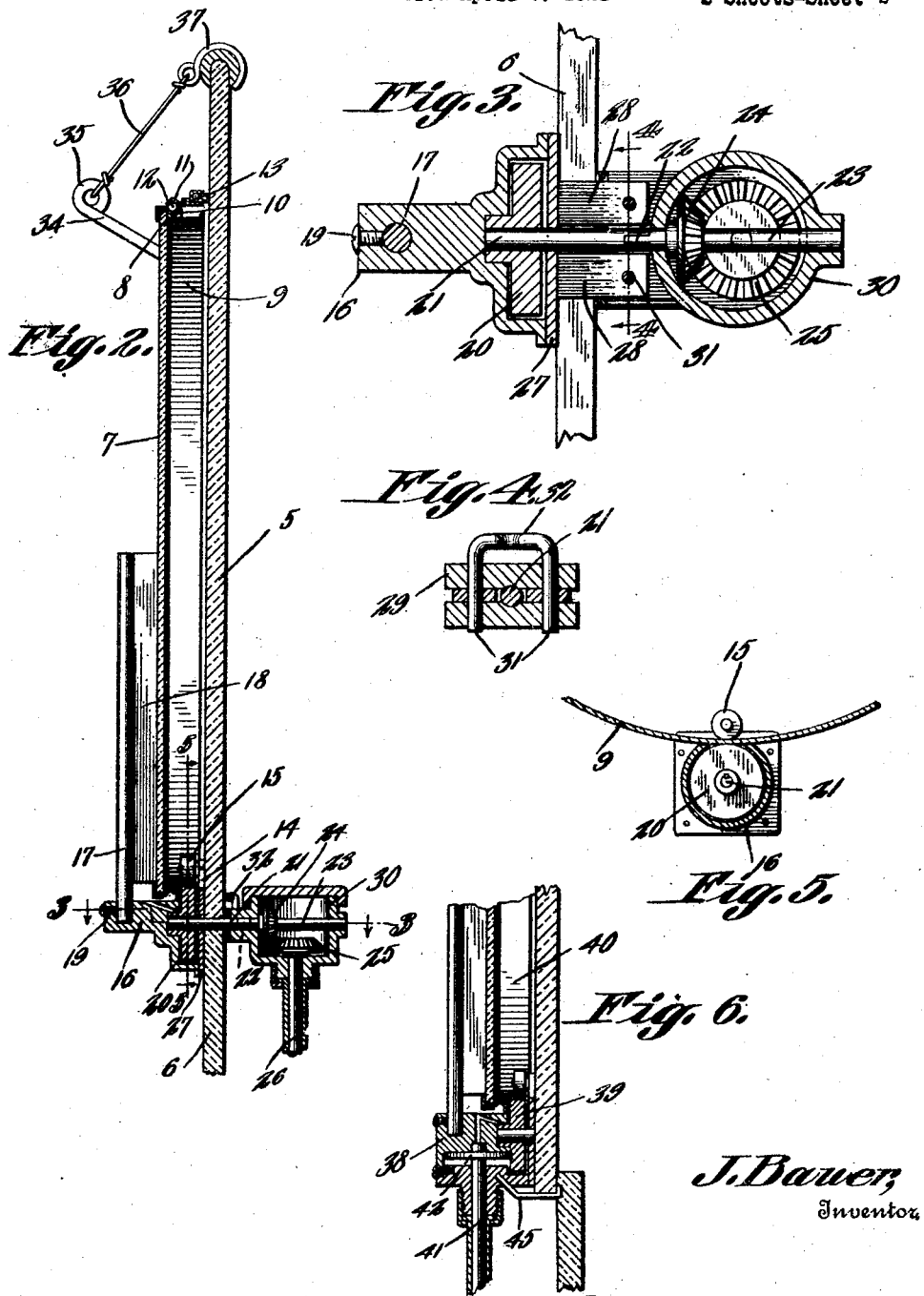
J. Bauer,
Inventor
By C.A. Snow & Co.
Attorneys Patented Apr. 19, 1927.

1,624,906

UNITED STATES PATENT OFFICE.

JOHN BAUER, OF DETROIT, MICHIGAN.

WINDSHIELD.

Application filed April 9, 1923. Serial No. 630,829.

This invention has reference to windshield wipers, and aims to provide novel means whereby the line of vision through a windshield may be maintained unobstructed.

Another object of the invention is to provide an auxiliary shield to be applied to the usual windshield construction, means being provided to rotate the auxiliary shield to free the same of moisture or other foreign matter.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a vertical sectional view through the windshield and auxiliary shield.

Figure 3 is a sectional view taken on line 3—3 of Figure 2.

Figure 4 is a sectional view taken on line 4—4 of Figure 3.

Figure 5 is a sectional view taken on line 5—5 of Figure 2, parts of the windshield being omitted.

Figure 6 is a fragmental sectional view of a modified form of the invention.

Figure 1:
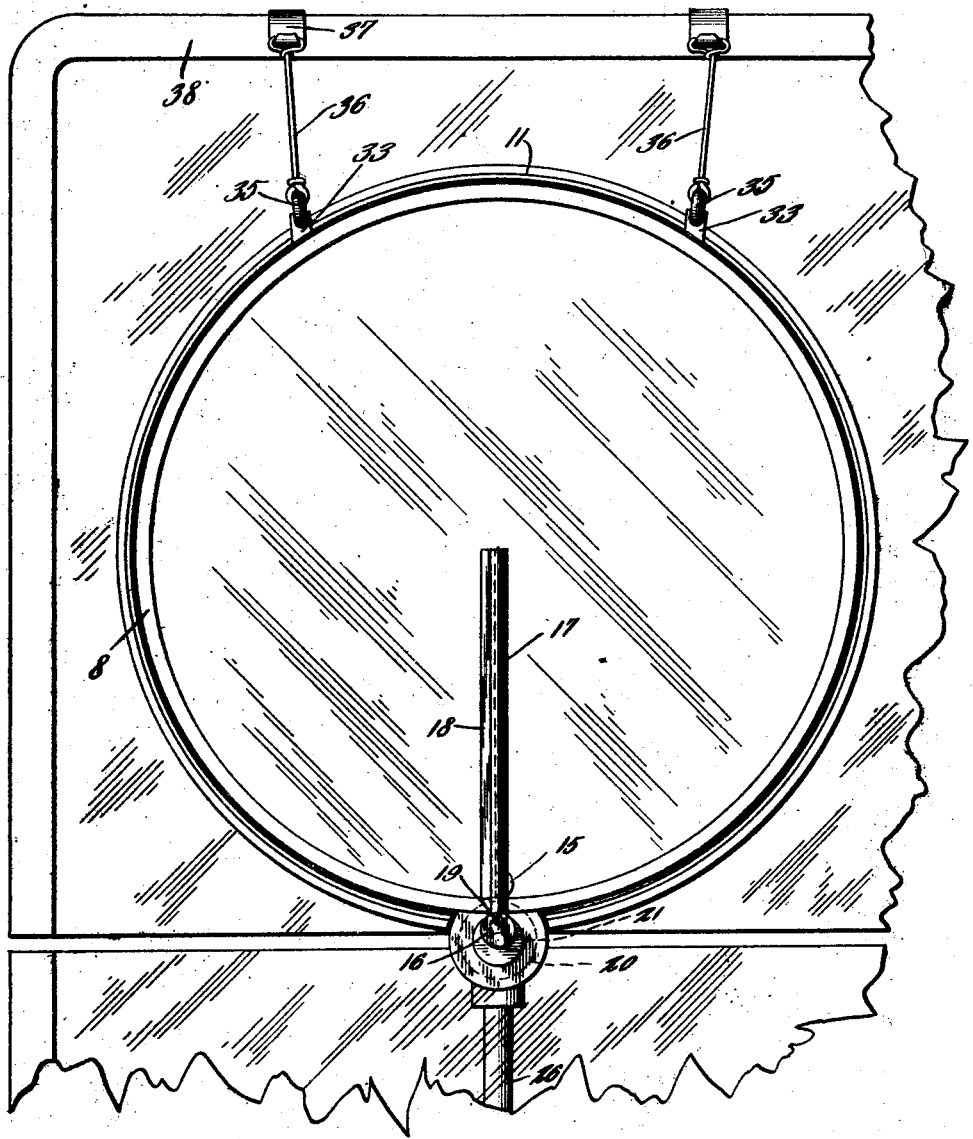
Figure 1 is a fragmental elevational view of a windshield, disclosing a protector constructed in accordance with the present invention as applied.

Referring to the drawings in detail, the reference character 5 designates the upper section of a windshield, while the reference character 6 designates the lower section thereof.

The auxiliary shield is circular in formation and is indicated at 7, the same being formed with glass or other transparent material and supplied with a supporting rim 8 which is also circular in formation, the rim having an inwardly extended flange 9 that has its inner edge disposed in spaced relation with the windshield section 5, to permit the auxiliary shield to rotate freely.

A curved track section 10 is secured to the auxiliary shield 7 and cooperates with the curved guard 11 to provide a track for the balls 12 that are disposed between the members 8 and 11 to reduce friction between the members 8 and 11 and insure free operation of the windshield 7.

The member 11 also supports a rubber ring 13 that closely engages the outer surface of the windshield 5 at its upper portion to prevent moisture from contacting with sections 5 and 7. As shown, this member 11 is circular in formation to provide a support or track for the shield 7, the lower portions of the member 13 being cut away to provide openings and allow of a free circulation of air between the section 5 and auxiliary windshield to prevent sweating of the members 5 or 7. The lower portion of the member 13 is also cut away to permit the arm 14 to extend to a position under the auxiliary shield 7 where the same is supplied with a roller 15 contacting with the inner curved surface of the flange 9 to restrict movement of the flange.

A gear support is indicated at 16 and is formed with an opening to accomodate the rod 17 that supports the rubber wiping element 18, the rod 17 being held to the gear support 16 by means of the screw 19. Mounted within the gear support 16 is a friction gear 20 designed to engage the outer surface of the flange 9 to impart rotary movement to the flange 9 which in turn rotates the shield 7.

Reference character 21 designates a shaft on which the gear 20 is positioned, the shaft being provided with an opening in one end thereof to accommodate the reduced end 22 of the shaft 23 on which the pinion 24 is keyed or otherwise secured.

This pinion 24 is in mesh with the pinion 25 that receives motion from the shaft 26 that may be operated by any suitable means not shown. As shown, the shaft 21 extends between the upper section 5 and lower section 6 of the windshield, there being provided a plate 27 secured to one surface of the gear support 16, which plate has arms 28 extending between the members 29 of the gear housing 30. The members 29 are formed with openings adapted to register with openings in the arms 28 for the reception of the arms 31 of the inverted U-shaped securing member 32. Thus it will be seen that due to this construction, the gear housing 30 may be readily disconnected from the gear support 16 if it is desired to remove the same.

The upper portion of the auxiliary windshield is formed with upwardly extended ears 33 that accommodate the rods 34 formed with loop portions 35 at their outer ends, the rods being of lengths to extend beyond the windshield section 5 where they have connection with rods 36.

These rods 36 have connection with the hook members 37 that rest over the upper portion of the windshield frame 38 and support the upper portion of the auxiliary shield.

In the form of the invention as shown by Figure 6 of the drawing, the gear support is indicated at 38, in which is positioned the friction gear 39 that engages with the flange 40 of the rotatable auxiliary windshield to impart rotary motion thereto.

An operating shaft 41 extends into the gear support and on one end of the shaft is positioned a friction gear 42 contacting with one of the side faces of the friction gear 39, whereupon rotary motion is imparted to the friction gear 39.

In the operation of the device, it will be seen that when it is desired to operate the wiper to remove foreign matter from the windshield, the gear 20 as shown by Figure 2 of the drawings, is rotated through the shafts 26, 21 and pinions mounted thereon. It is obvious that as the friction gear 20 rotates, rotary movement is imparted to the auxiliary shield 7, rotating the same against the wiper 18 removing the foreign matter therefrom.

It might be further stated that the form of the invention as illustrated by Figure 6 of the drawings is especially designed for use in connection with overlapping windshield sections, and to this end, arms 45 are provided which extend under the upper section of the windshield and have connection with the gear support 38 in any suitable manner.

What is claimed as new is:—

A windshield protector embodying a substantially circular guarding member, a rubber ring carried by the guarding member and adapted to engage the windshield to which the device is secured, a circular shield supported for rotation within the guarding member, a flange to which the shield is secured, said flange resting in spaced relation with the windshield to which the device is secured, a stationary wiping member contacting with the shield, a gear supported under the shield and contacting with the flange, means for rotating the gear to rotate the shield, and means for securing the windshield protector to a windshield.

In testimony that I claim the foregoing as my own, I have hereto affixed my signature.

JOHN BAUER.